(12) United States Patent
Villegas (10) Patent No.: US 12,545,309 B2
(45) Date of Patent: Feb. 10, 2026

(54) WREATH TRANSPORTING DEVICE

(71) Applicant: Rey Villegas, Marion, TX (US)

(72) Inventor: Rey Villegas, Marion, TX (US)

( * ) Notice: Subject to any disclaimer, the term of this patent is extended or adjusted under 35 U.S.C. 154(b) by 311 days.

(21) Appl. No.: 18/207,780

(22) Filed: Jun. 9, 2023

(65) Prior Publication Data

US 2024/0409140 A1 Dec. 12, 2024

(51) Int. Cl.
*B62B 1/26* (2006.01)
*B62B 1/12* (2006.01)
*B62B 5/06* (2006.01)

(52) U.S. Cl.
CPC .............. *B62B 1/26* (2013.01); *B62B 1/125* (2013.01); *B62B 5/067* (2013.01)

(58) Field of Classification Search
CPC ............ B62B 1/26; B62B 1/125; B62B 5/067
See application file for complete search history.

(56) References Cited

U.S. PATENT DOCUMENTS

| | | | |
|---|---|---|---|
| 3,306,624 A * | 2/1967 | Goss | B65G 49/061 280/47.24 |
| 3,356,383 A | 12/1967 | Sneed | |
| 3,867,975 A * | 2/1975 | Johnson | B60C 25/04 157/1.24 |
| 4,657,268 A * | 4/1987 | Colson | A47L 11/4075 280/47.27 |
| 4,832,294 A * | 5/1989 | Eidem | F16M 11/42 248/129 |
| D332,311 S * | 1/1993 | Redding | D24/128 |
| 6,027,128 A * | 2/2000 | Stich | B60B 33/0002 280/47.35 |
| 6,053,516 A | 4/2000 | Ottaway | |
| 6,250,655 B1 * | 6/2001 | Sheeks | B62B 3/108 280/652 |
| 6,352,269 B1 | 3/2002 | Chinigo | |
| D465,897 S * | 11/2002 | Smith | D34/24 |
| 6,962,353 B1 * | 11/2005 | Garcia | B62B 1/14 280/47.24 |
| D526,105 S * | 8/2006 | Van Es | D34/21 |
| 7,226,062 B1 * | 6/2007 | Stefano | A63C 17/28 280/263 |
| D578,724 S | 10/2008 | Mulka | |
| 7,584,973 B2 * | 9/2009 | Brager | B25H 3/026 248/404 |

(Continued)

FOREIGN PATENT DOCUMENTS

BR 202022012518 U2 * 1/2024 ............... B62B 3/02
FR 2897879 A1 * 8/2007 ............... B62B 1/26

(Continued)

*Primary Examiner* — Jacob B Meyer (57) ABSTRACT

A wreath transporting device for transporting a plurality of wreathes includes a rod, which is attached to and which extends substantially perpendicularly from a center of an upper face of a base plate. The rod is sequentially insertable into central holes of a plurality of wreathes so that the wreathes are stacked upon the upper face of the base plate. Each wheel of a pair of wheels is axially and rotationally attached to the base plate, with the wheels being opposingly positioned on a circumference of the base plate. The rod can be grasped in a hand of a user, enabling the user to exert a lateral force to the base plate to motivate the base plate and the wreathes along a surface from one location to another.

12 Claims, 6 Drawing Sheets

(56) References Cited

U.S. PATENT DOCUMENTS

| | | | | |
|---|---|---|---|---|
| 7,624,953 | B2 * | 12/2009 | Silverman | A61M 5/1415 248/129 |
| 7,731,136 | B1 * | 6/2010 | Chisolm | A61M 5/1415 248/129 |
| D627,063 | S * | 11/2010 | West | D24/128 |
| 8,002,291 | B1 * | 8/2011 | Sandoval | B62B 5/0083 280/47.32 |
| 8,505,934 | B2 * | 8/2013 | Rodney | B62B 1/26 280/47.131 |
| 9,079,600 | B2 * | 7/2015 | Houlihan | B62B 3/10 |
| 9,452,767 | B2 * | 9/2016 | Falcaro | B62B 5/067 |
| 9,511,786 | B1 * | 12/2016 | Hickcox | B62B 5/0083 |
| 9,895,586 | B2 | 2/2018 | Hecht | |
| D846,221 | S | 4/2019 | Bom | |
| 10,275,019 | B1 * | 4/2019 | Tett | G06F 3/011 |
| 11,945,485 | B2 * | 4/2024 | Loy | B62B 1/14 |
| 2003/0090074 | A1 * | 5/2003 | Smith | B62B 1/26 280/47.34 |
| 2005/0150991 | A1 * | 7/2005 | Priefert | B62B 1/26 242/597.7 |
| 2005/0189005 | A1 * | 9/2005 | Smith | G09F 23/00 135/16 |
| 2014/0265253 | A1 * | 9/2014 | Ingrasci | B62B 3/106 280/47.35 |
| 2024/0010254 | A1 * | 1/2024 | Penna | B62B 1/06 |
| 2024/0174272 | A1 * | 5/2024 | Loy | B62B 1/14 |
| 2024/0409140 | A1 * | 12/2024 | Villegas | B62B 5/06 |

FOREIGN PATENT DOCUMENTS

| | | | | |
|---|---|---|---|---|
| GB | 553294 | A * | 5/1943 | A45B 1/02 |
| JP | 2009023652 | A * | 2/2009 | |
| KR | 20140000165 | U * | 1/2014 | B62B 5/061 |
| WO | WO2017197416 | | 11/2017 | |

* cited by examiner

WREATH TRANSPORTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dollies and more particularly pertains to a new dolly for transporting a plurality of wreathes. Various holidays require users to place and subsequently collect large numbers of wreathes without a dedicated device to facilitate their transport.

(2) Description of Related Art Including Information Disclosed Under 37 CFR 1.97 and 1.98

The prior art relates to dollies but does not teach a dolly configured for transporting a plurality of wreathes.

BRIEF SUMMARY OF THE INVENTION

An embodiment of the disclosure meets the needs presented above by generally comprising a rod, which is attached to and which extends substantially perpendicularly from a center of an upper face of a base plate. The rod is configured for sequential insertion into central holes of a plurality of wreathes so that the wreathes are stacked upon the upper face of the base plate. Each wheel of a pair of wheels is axially and rotationally attached to the base plate, with the wheels being opposingly positioned on a circumference of the base plate. The rod is configured to be grasped in a hand of a user, enabling the user to exert a lateral force to the base plate through the rod so that the base plate and the wreathes are motivated along a surface from one location to another.

Another embodiment of the disclosure includes a method of transporting and distributing a plurality of wreathes. The method entails provision of the dolly, according to the disclosure above, and the steps of motivating the device to a supply location, loading a plurality of wreathes upon the base plate, motivating the device and wreathes to a first location, extracting an uppermost one of the plurality of wreathes and positioning it, as desired, proximate to the first location. The extraction and positioning steps are repeated, as required, at the first location. As required, the device and remaining wreathes are moved to subsequent locations for positioning of additional wreathes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new dolly embodying the principles and concepts of an embodiment of the disclosure and generally designated by the reference numeral 10 will be described.

Figure 1:
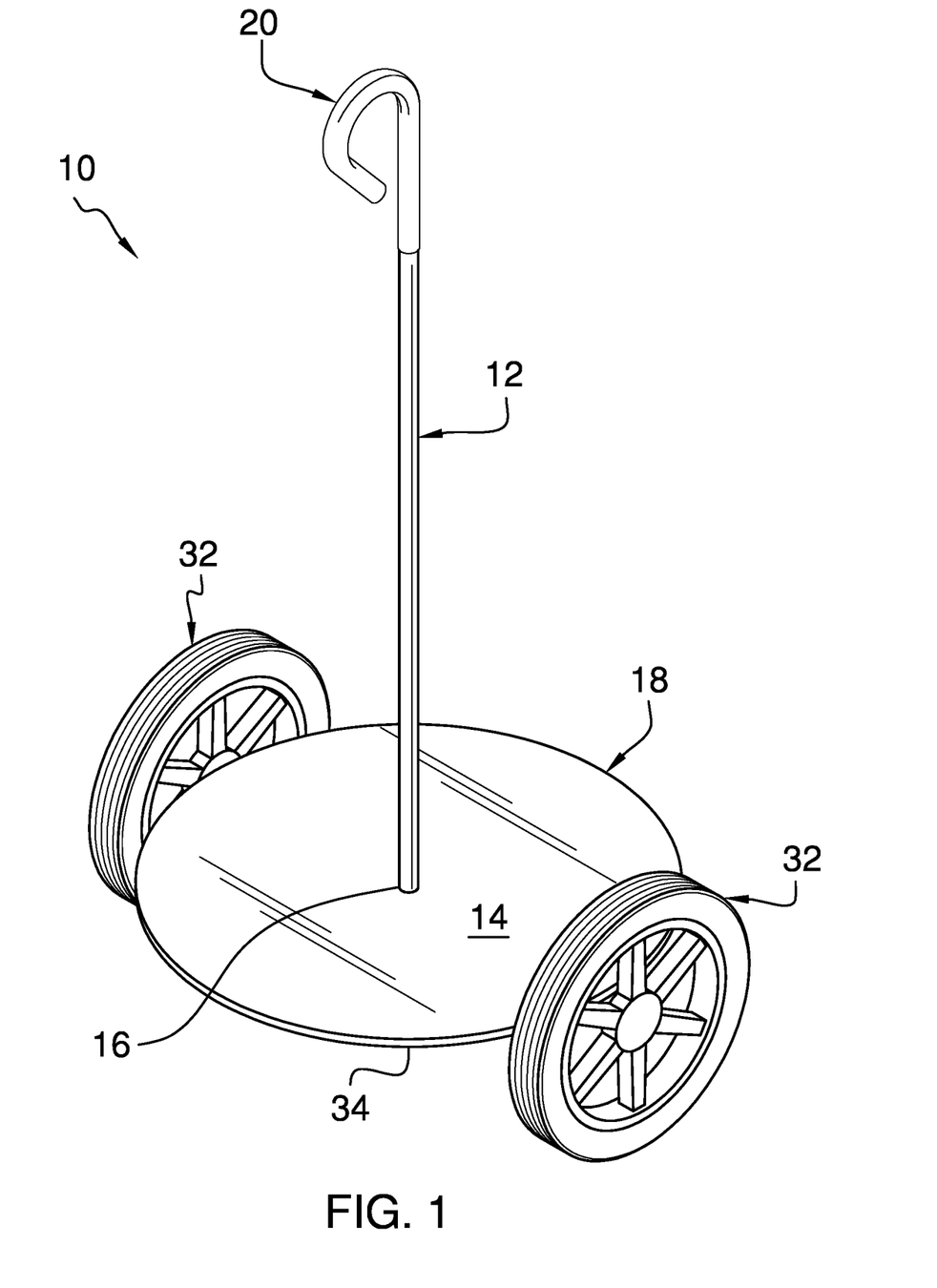
FIG. 1 is an isometric perspective view of a wreath transporting device according to an embodiment of the disclosure.
Figure 2:
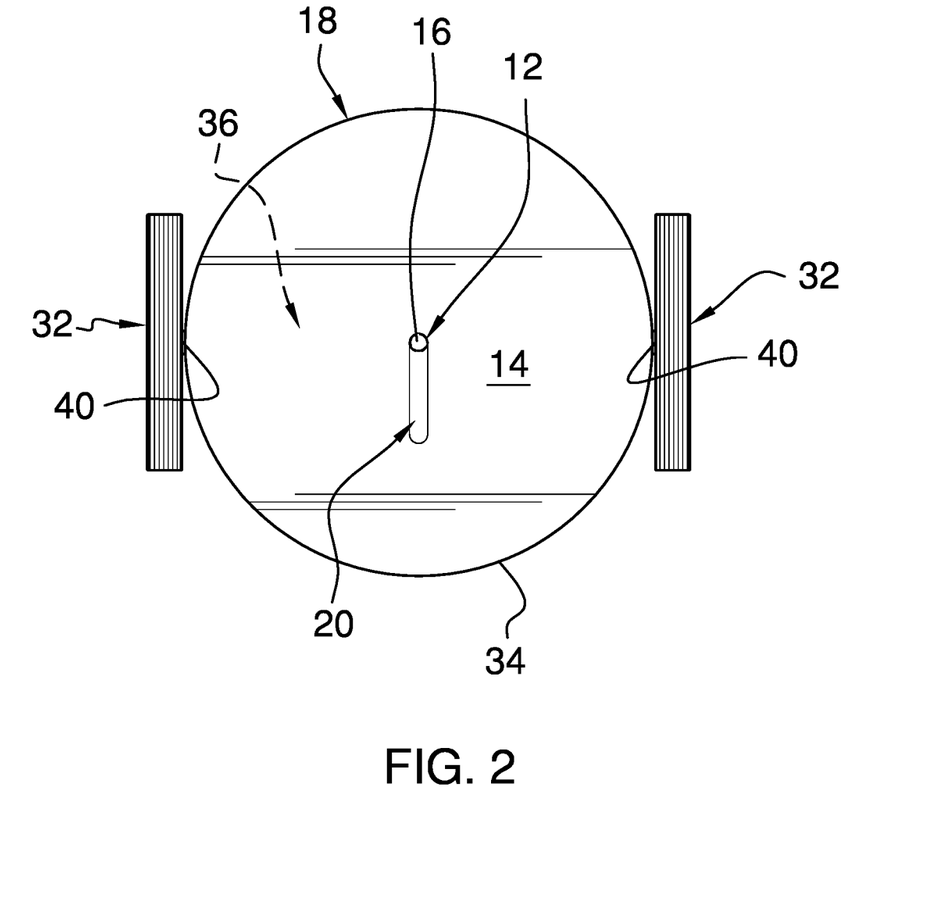
FIG. 2 is a top view of an embodiment of the disclosure.
Figure 3:
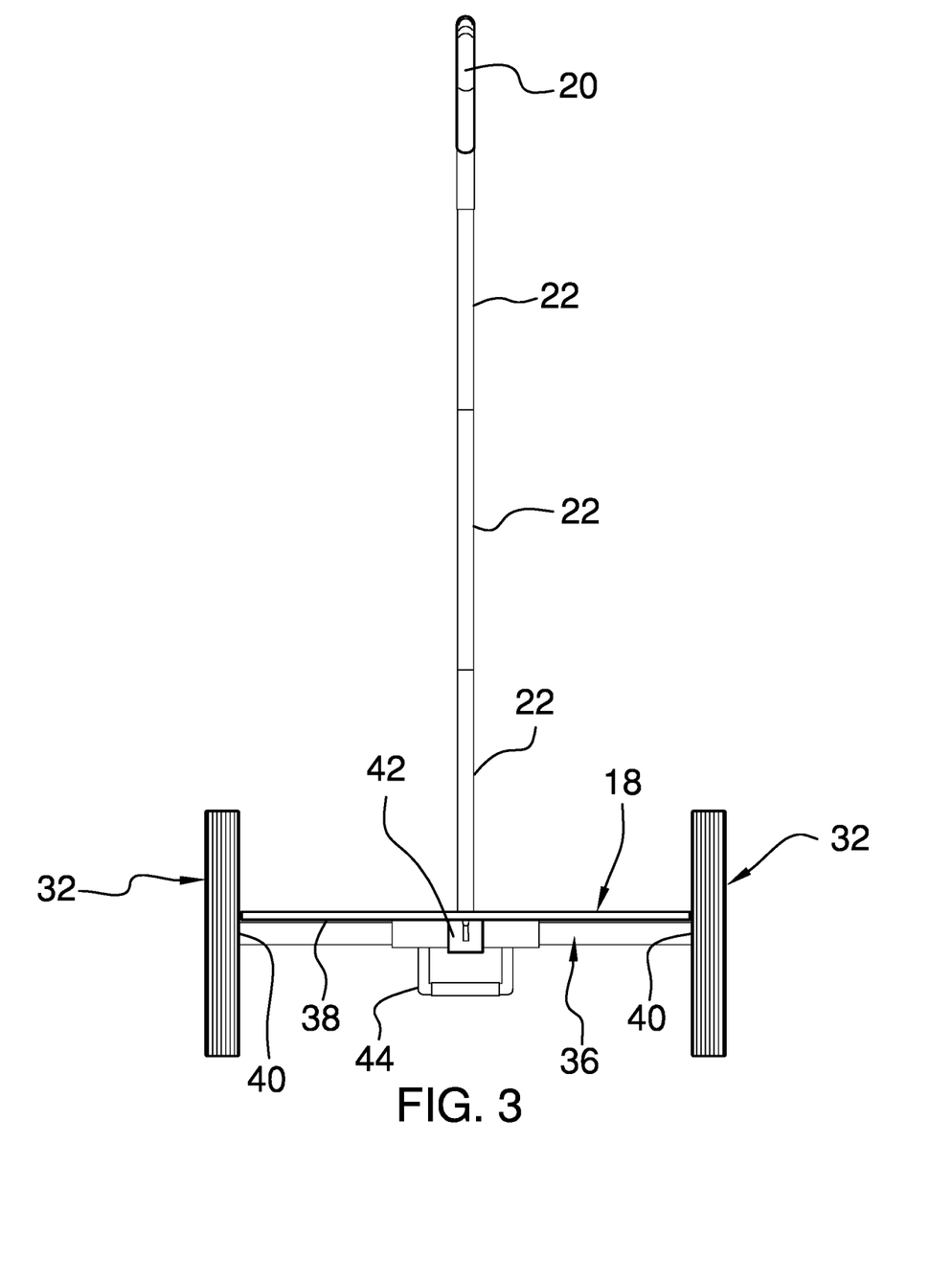
FIG. 3 is a front view of an embodiment of the disclosure.

As best illustrated in FIGS. 1 through 6, the wreath transporting device 10 generally comprises a rod 12, which is attached to and which extends substantially perpendicularly from a center 14 of an upper face 16 of a base plate 18. A handle 20 is attached to the rod 12 distal from the base plate 18 and is configured to be grasped in the hand of the user. The handle 20 and the rod 12 have a combined length of 120.0 to 215.0 cm. The handle 20 and the rod 12 may have a combined length of 150.0 to 185.0 cm. As is shown in FIG. 3, the rod 12 may comprise a plurality of nested sections 22 and thus be selectively extensible, thus facilitating stowage of the wreath transporting device 10 when it's use is not required.

Figure 5:
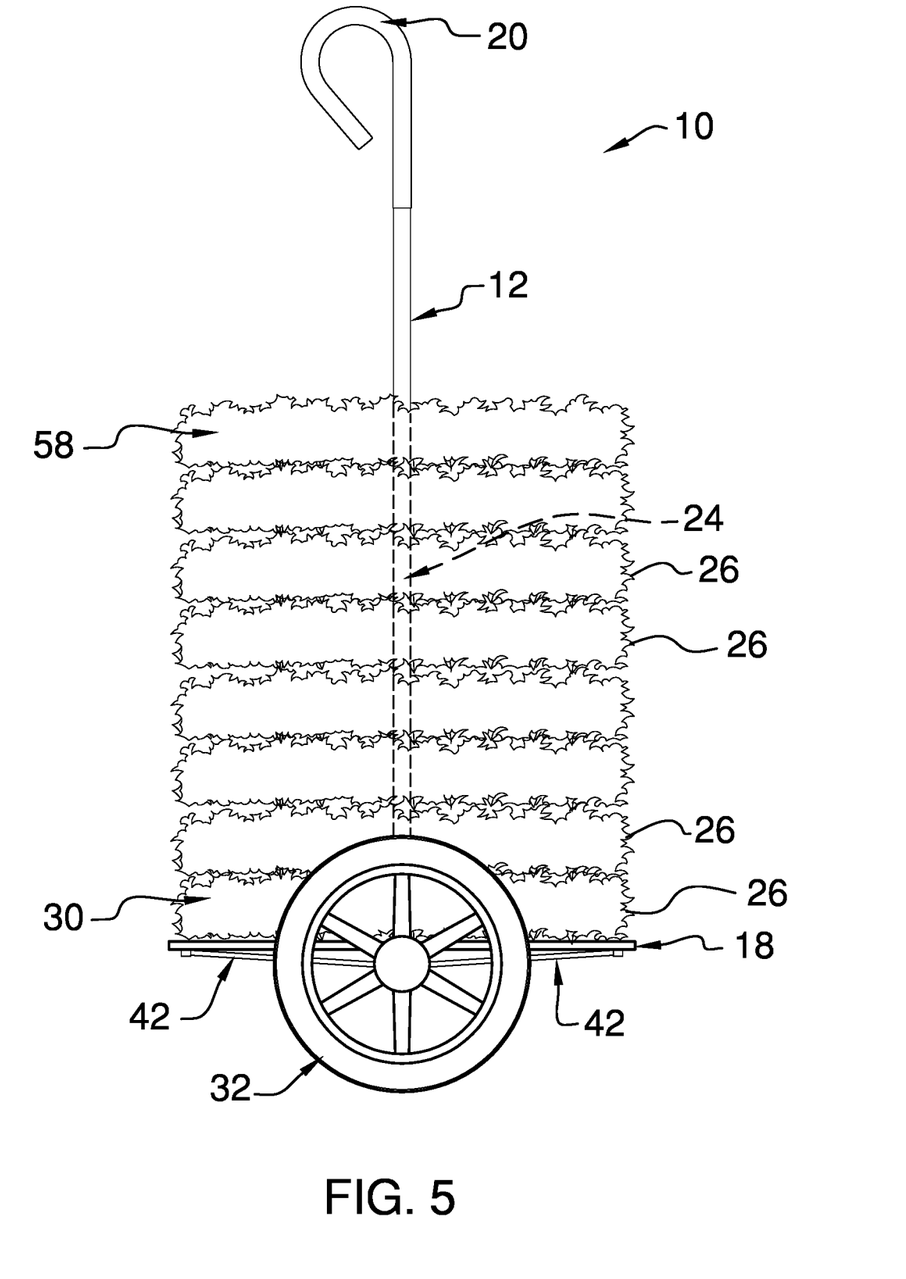
FIG. 5 is an in-use view of an embodiment of the disclosure.

The rod 12 is configured for sequential insertion into central holes 24 of a plurality of wreathes 26 so that the wreathes 26 are stacked upon the upper face 16 of the base plate 18, as is shown in FIG. 5. The wreathes 26 intertwine sufficiently that the wreathes 26 forms a substantially stable tubular structure 28. The rod 12 and the base plate 18 comprise metal, wood, rigid plastic, or the like. The present invention anticipates the upper face 16 of the base plate 18 being textured so as to frictionally engage a lowermost one 30 of the wreathes 26 to deter slippage of the plurality of wreathes 26 upon the upper face 16. Outdoor carpet, textured rubber matting, or the like, also may be attached to the upper face 16 of the base plate 18 to deter slippage of the plurality of wreathes 26 upon the upper face 16.

As is shown in FIG. 2, the base plate 18 is substantially circular and has a diameter of 75.0 to 150.0 cm. The base plate 18 may have a diameter of 90.0 to 125.0 cm. The base plate 18 being substantially circular renders it complementary to the shape of a typical wreath 26, although the present invention also anticipates the base plate 18 being alternatively shaped, such as, but not limited to, oval, rectangular, or the like.

Each wheel 32 of a pair of wheels 32 is axially and rotationally attached to the base plate 18, with the wheels 32 being opposingly positioned on a circumference 34 of the base plate 18. The rod 12 is configured to be grasped in a hand of a user, enabling the user to exert a lateral force to the base plate 18 through the rod 12 so that the base plate 18 and the wreathes 26 are motivated along a surface from one location to another. The present invention is anticipated to be useful in situations wherein a large number of wreathes 26 are required to be positioned and subsequently collected. For example, wreathes 26 often are placed or otherwise displayed on a large number of graves on certain days, such as Memorial Day, Veteran's Day, and the like.

An axle 36 is attached to a lower face 38 of the base plate 18, with the wheels 32 being attached singly to opposed ends 40 of the axle 36. Each strut 42 of a pair of struts 42 is attached to and extends substantially perpendicularly from the axle 36. The strut 42 also is attached to the lower face 38 of the base plate 18, proximate to the circumference 34 of the base plate 18, thereby rigidifying the base plate 18.

Figure 4:
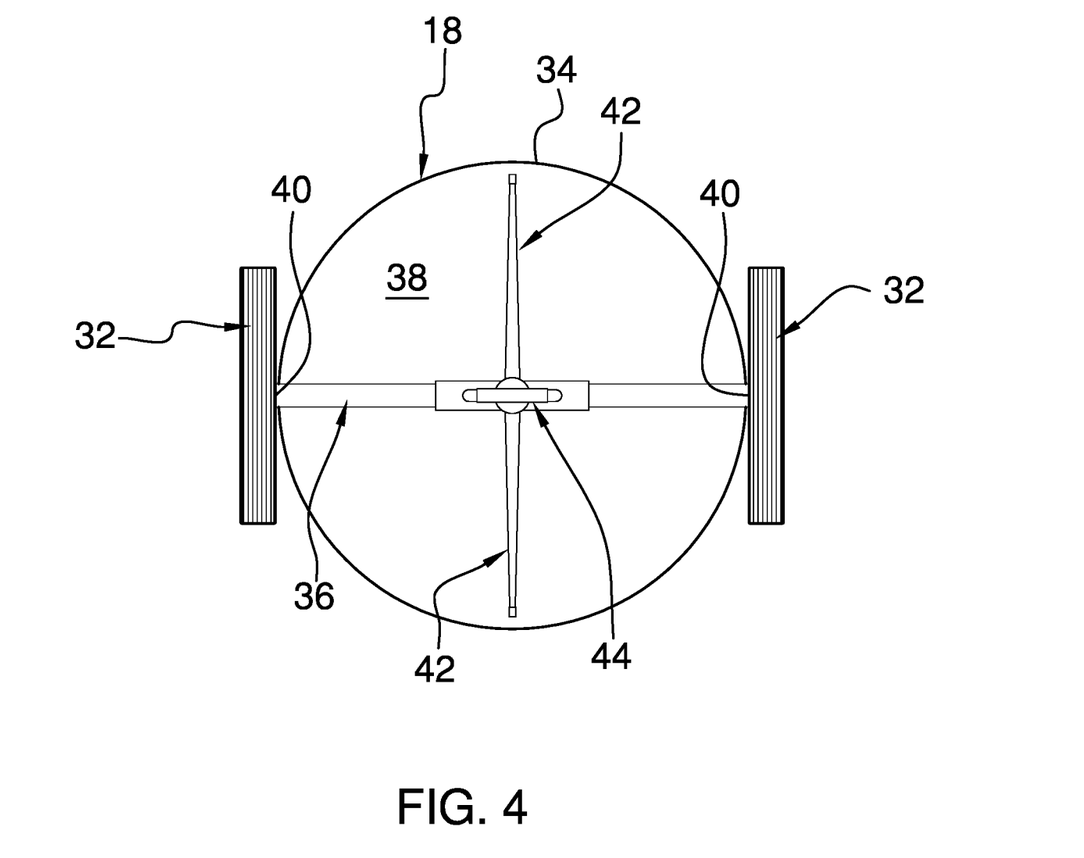
FIG. 4 is a bottom view of an embodiment of the disclosure.

A grasp 44 is attached to the lower face 38 of the base plate 18, as is shown in FIG. 4. The grasp 44 is configured to be grasped in a hand of a first user, such that, with the handle 20 being grasped by a second user, the plurality of wreathes 26 can be lifted and transported over an uneven surface, such as stairs, ruts, or the like. The present invention also anticipates the handle 20 being rotationally attached to the rod 12 and/or the rod 12 being rotationally attached to the base plate 18, thereby allowing the grasp 44 and the handle 20 to be aligned for more comfortable lifting and transporting of the plurality of wreathes 26.

Figure 6:
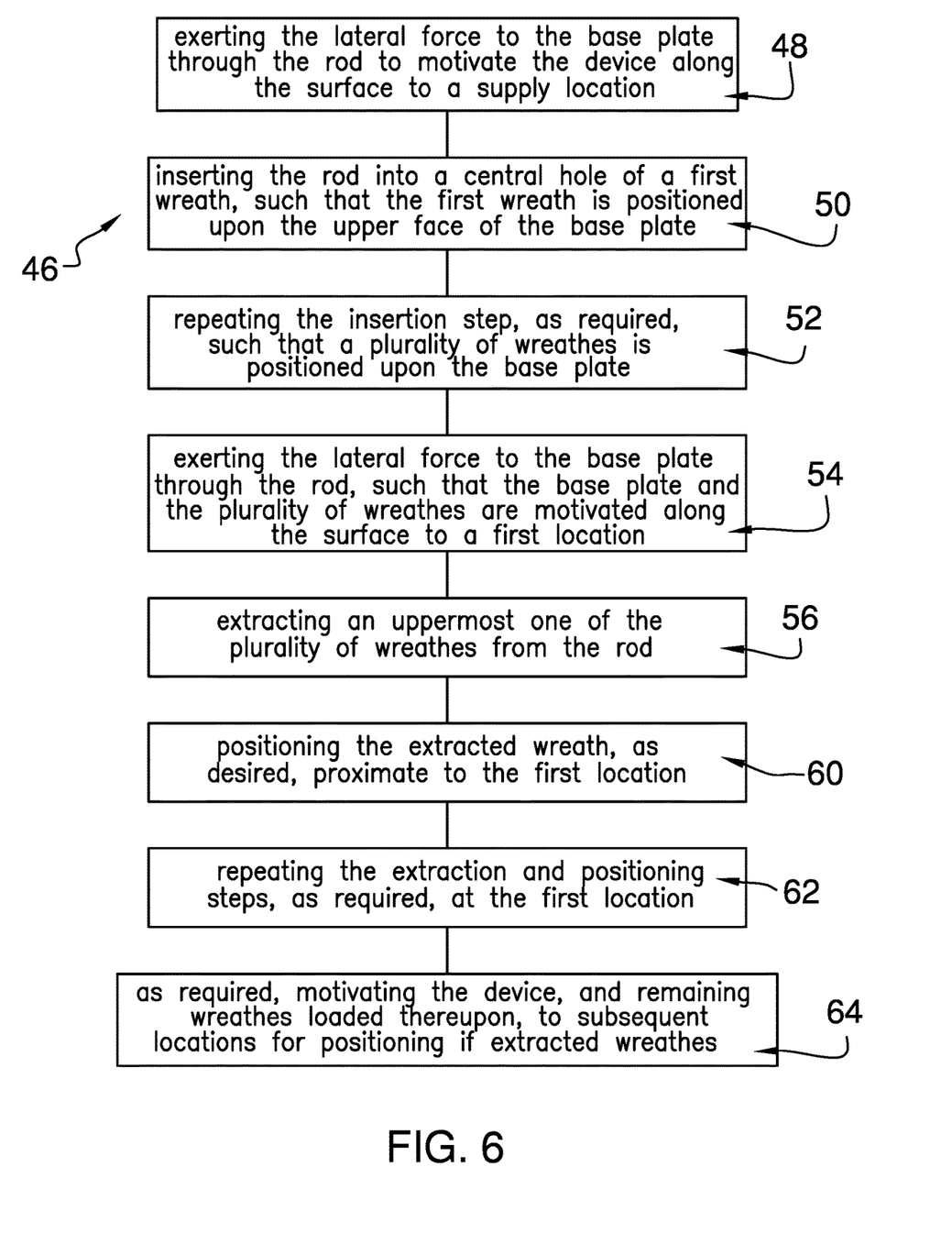
FIG. 6 is a flow diagram for a method utilizing an embodiment of the disclosure.

In use, the wreath transporting device 10 enables a method of transporting and distributing a plurality of wreathes 46. The method 46 entails provision of the wreath transporting device 10, according to the specification above. A first step 48 of the method 46 is exerting the lateral force to the base plate 18 through the rod 12 to motivate the device along the surface to a supply location. A second step 50 of the method 46 is inserting the rod 12 into a central hole of a first wreath 26 so that the first wreath 26 is positioned upon the upper face 16 of the base plate 18. A third step 52 of the method 46 is repeating the insertion step, as required, so that a plurality of wreathes 26 is positioned upon the base plate 18. A fourth step 54 of the method 46 is exerting the lateral force to the base plate 18 through the rod 12 so that the base plate 18 and the plurality of wreathes 26 are motivated along the surface to a first location. A fifth step 56 of the method 46 is extracting an uppermost one 58 of the plurality of wreathes 26 from the rod 12. A sixth step 60 of the method 46 is positioning the extracted wreath 26, as desired, proximate to the first location. A seventh step 62 of the method 46 is repeating the extraction and positioning steps, as required, at the first location. An eighth step 64 of the method 46 is, as required, motivate the device and remaining wreathes 26 loaded thereupon to subsequent locations for positioning of extracted wreathes 26. As will be apparent, the steps of the method 46 can be reversed to collect and transport the wreathes 26 back to the supply location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wreath transporting device comprising:
   a base plate;
   a rod attached to and extending substantially perpendicularly from a center of an upper face of the base plate, wherein the rod is configured for sequential insertion into central holes of a plurality of wreathes, such that the wreathes are stacked upon the upper face of the base plate;
   a pair of wheels, each wheel of the pair of wheels being axially and rotationally attached to the base plate, such that the wheels are opposingly positioned on a circumference of the base plate, wherein the rod is configured for grasping in a hand of a user, enabling the user to exert a lateral force to the base plate through the rod, such that the base plate and the plurality of wreathes are motivated along a surface;
   an axle attached to a lower face of the base plate, the wheels of the pair of wheels being attached singly to opposed ends of the axle; and
   a pair of struts, each strut being attached to and extending substantially perpendicularly from the axle, the strut being attached to the lower face of the base plate proximate to the circumference of the base plate.

2. The wreath transporting device of claim 1, wherein the base plate is substantially circular.

3. The wreath transporting device of claim 2, wherein the base plate has a diameter of 75.0 to 150.0 cm.

4. The wreath transporting device of claim 2, wherein the base plate has a diameter of 90.0 to 125.0 cm.

5. The wreath transporting device of claim 1, wherein the rod and the base plate comprise metal, wood, or rigid plastic.

6. The wreath transporting device of claim 1, further including a handle attached to the rod distal from the base plate, wherein the handle is configured for grasping in the hand of the user.

7. The wreath transporting device of claim 6, wherein the handle and the rod have a combined length of 120.0 to 215.0 cm.

8. The wreath transporting device of claim 6, wherein the handle and the rod have a combined length of 150.0 to 185.0 cm.

9. The wreath transporting device of claim 6, further including a grasp attached to the lower face of the base plate, wherein the grasp is configured for grasping in a hand of a first user, such that, with the handle being grasped by a second user, the plurality of wreathes can be lifted and transported over an uneven surface.

10. The wreath transporting device of claim 1, wherein the rod comprises a plurality of nested sections, such that the rod is selectively extensible.

11. A wreath transporting device comprising:
    a base plate, the base plate being substantially circular, the base plate having a diameter of 90.0 to 125.0 cm;
    a rod attached to and extending substantially perpendicularly from a center of an upper face of the base plate, wherein the rod is configured for sequential insertion into central holes of a plurality of wreathes, such that the wreathes are stacked upon the upper face of the base plate, the rod comprising a plurality of nested sections, such that the rod is selectively extensible, the rod and the base plate comprising metal, wood, or rigid plastic;
    a pair of wheels, each wheel of the pair of wheels being axially and rotationally attached to the base plate, such that the wheels are opposingly positioned on a circumference of the base plate, wherein the rod is configured for grasping in a hand of a user, enabling the user to exert a lateral force to the base plate through the rod, such that the base plate and the plurality of wreathes are motivated along a surface;
    an axle attached to a lower face of the base plate, the wheels of the pair of wheels being attached singly to opposed ends of the axle;
    a pair of struts, each strut being attached to and extending substantially perpendicularly from the axle, the strut being attached to the lower face of the base plate proximate to the circumference of the base plate;
    a handle attached to the rod distal from the base plate, wherein the handle is configured for grasping in the hand of the user, the handle and the rod having a combined length of 150.0 to 185.0 cm; and
    a grasp attached to the lower face of the base plate, wherein the grasp is configured for grasping in a hand of a first user, such that, with the handle being grasped by a second user, the plurality of wreathes can be lifted and transported over an uneven surface.

12. A method of transporting and distributing a plurality of wreathes, the method comprising providing the device of claim 1, and:
    exerting the lateral force to the base plate through the rod to motivate the device along the surface to a supply location;
    inserting the rod into a central hole of a first wreath, such that the first wreath is positioned upon the upper face of the base plate;
    repeating the insertion step, as required, such that a plurality of wreathes is positioned upon the base plate;
    exerting the lateral force to the base plate through the rod, such that the base plate and the plurality of wreathes are motivated along the surface to a first location;
    extracting an uppermost one of the plurality of wreathes from the rod;
    positioning the extracted wreath, as desired, proximate to the first location;
    repeating the extraction and positioning steps, as required, at the first location; and
    as required, motivating the device, and remaining wreathes loaded thereupon, to subsequent locations for positioning of extracted wreathes.

* * * * *